S. H. WOODBRIDGE.
VALVE.
APPLICATION FILED DEC. 12, 1906.
966,150.
Patented Aug. 2, 1910.
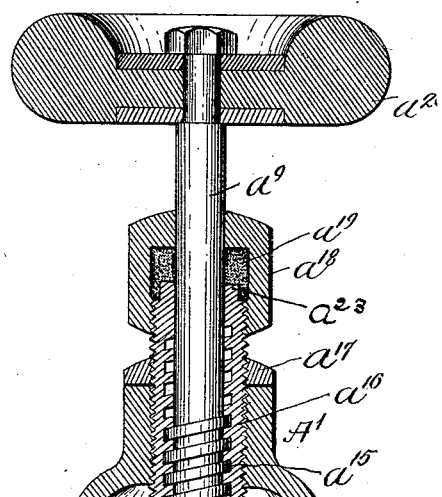
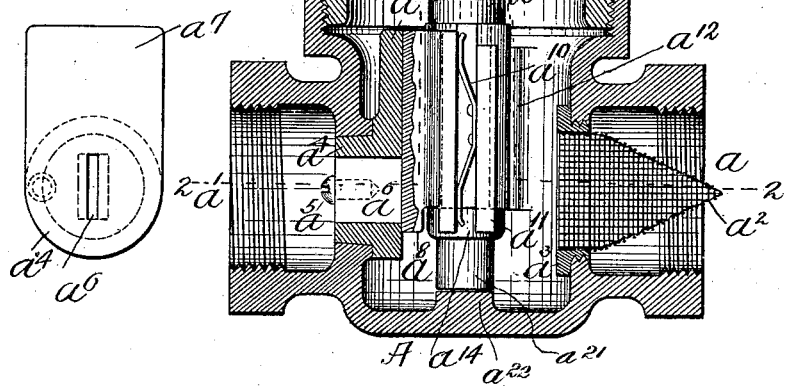
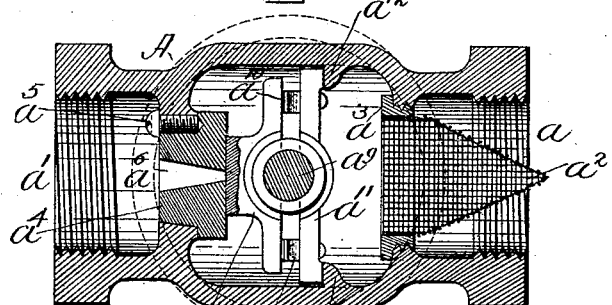

UNITED STATES PATENT OFFICE.

SAMUEL H. WOODBRIDGE, OF NEWTON, MASSACHUSETTS.

VALVE.

966,150.  Specification of Letters Patent.  Patented Aug. 2, 1910.

Application filed December 12, 1906. Serial No. 347,486.

*To all whom it may concern:*

Be it known that I, SAMUEL H. WOODBRIDGE, of Newton, in the county of Middlesex and State of Massachusetts, a citizen of the United States, have invented a new and useful Improvement in Valves, of which the following is a full, clear, and exact description, reference being had to the accompanying drawings, forming a part of this specification, in explaining its nature.

My invention relates to that type of valve known as a fractional valve, the purpose of which is to graduate the supply or quantity of steam or water passing through it as requirements may demand. Inasmuch as the opening or aperture within the valve must necessarily be small or of such construction that a minimum amount of steam or water can pass through it under certain circumstances of use, difficulty has heretofore been found in that the aperture becomes clogged with rust, gum, sand or other debris. This debris becomes lodged between the valve and its seat so preventing a tight closing of the valve, or it may completely fill the aperture making the valve useless.

My invention consists in the first instance in providing the valve with such means that the difficulties above referred to are corrected.

My invention consists also in providing the valve with an extremely simple and efficient valvular structure, especial attention having been directed also to the means by which a graduated opening of the valve may be obtained, my desire being in this particular to furnish a means which is easily accessible and so arranged that the adjustment of the valve may be obtained from outside the valve casing without disturbing the interior valvular working.

My invention, however, can best be seen and understood by reference to the drawings in which—

Figure 1 shows the valve in vertical cross section. Fig. 2 shows a cross section on the line 2—2 of Fig. 1, and Fig. 3 shows the valve seat in elevation; to this special reference will hereinafter be made.

In the drawings:—A represents the main valve casing or body of the valve. Mounted on the main casing and making threaded connection therewith is an auxiliary casing or bonnet $A^1$, which increases the inside area of the valve casing on cross section through the valve stem and assists in the valvular retention and guidance, as will hereinafter be explained.

The main casing or body of the valve is provided at the respective ends thereof with an inlet passage $a$ and an outlet passage $a^1$ between which is the chamber containing the valve. Within the inlet passage in the path of the steam or water flow is placed a conical filter $a^2$. The filter is made to provide a perforated area, relatively large to that of the inlet passage and with perforations or apertures so small as to exclude everything of a size sufficient to clog the port of the valve, to which reference will hereinafter be made. The filter is attached to a bushing $a^3$ which makes threaded connection with the interior of the valve casing and may be removed through the body of the valve when the bonnet $A^1$ is removed, the bushing being provided with means for screwing it to place.

At the entrance to the outlet passage $a^1$ of the casing there is to be noted what may be termed a removable valve seat $a^4$. This is made in part conical in shape forming a plug which fits snugly within the interior wall of the casing, in which it is held by a set screw $a^5$. Within this plug is a slot forming a valve port $a^6$. The port is long and narrow, its major axis being parallel with the direction in which the valve moves, as will hereinafter be explained. It is also to be noted that the slot forming the port flares outwardly toward the outlet passage, thus insuring a clearing of the port if any foreign substance enters the same. The plug forms only a portion of the valve seat. It is supplemented by the seat extension $a^7$, which is preferably formed integral with the plug, and which extension acts to support the valve when opened to its full extent, as will hereinafter be explained. Sliding upon the valve seat, thus formed, and across the port or opening therein, is a valve $a^8$ operated by the valve stem $a^9$ which extends up through the bonnet $A^1$ to a point outside the valve casing and with which stem the valve connects. The valve operates in the direction of the major axis of the slot, or port, in the valve seat, as was before explained, on which account the valve, depending upon its position, will either entirely close said port or leave the same partially or entirely open. Moreover, the closing edge of the valve is shaped for the purpose of scraping and clearing the valve port as the valve slides over the same and accordingly completely removing all material which might tend to attach itself to the valve seat and obstruct the port-way therein.

The valve is held in place upon the valve seat by means of springs $a^{10}$ arranged on either side of the valve stem $a^9$. These springs are attached to a companion piece $a^{11}$ to the valve which is backed and held against turning by flanges $a^{12}$ extending from the interior of the main valve casing. The valve and its companion piece are cored to fit around the valve stem between the collars $a^{13}$, $a^{14}$ on said stem, the parts being held in conjunction when interposed between the valve seat on the one side and the flanges $a^{12}$, on the other side.

As before explained, the valve stem extends up through the bonnet $A^1$ of the casing where it is provided with a threaded portion $a^{15}$ which fits into the grooves of an elongated nut $a^{16}$. This elongated nut is threaded into the bonnet $A^1$ of the casing and is held in place by a locking nut $a^{17}$. On the end of the elongated nut and fixedly threaded thereto is a cap $a^{18}$ containing packing $a^{19}$. The valve stem is operated by the usual hand-wheel $a^{20}$. With this arrangement of parts the valve is operated to slide upon its valve seat by turning the valve stem up or down in the elongated nut in which it is threaded. The valve stem is of such length that when the valve is properly closed the end $a^{21}$ of the stem will encounter a stop $a^{22}$ formed on the interior of the main valve casing.

The degree of opening of the valve is determined by the engagement of the collar $a^{13}$ on the valve stem with the end of the elongated nut, which acts as a stop against further turning out of the valve stem and consequent opening of the valve. Accordingly by adjusting the elongated nut in the bonnet $A^1$ in which it is threaded the position of the end of the elongated nut may be so changed as to determine the distance that the stem can be turned out and its collar $a^{13}$ will be engaged by the elongated nut, which accordingly determines the degree of opening of the valve. The elongated nut may be adjustably turned in or out in the bonnet $A^1$ after the locking nut $a^{17}$ is loosened by means of an instrument or wrench applied to the cap nut $a^{18}$, or better by an instrument or wrench applied directly to the head $a^{23}$ of the elongated nut, the cap nut, of course, first being removed. The facility with which this adjustment of the valve can be obtained, simply by releasing the locking nut and then turning the elongated nut in or out, as before explained, without the necessity of disturbing the interior parts or workings of the valve, is especially to be noted. Moreover the interior of the valve casing is readily accessible by the removal of the bonnet $A^1$ when the valve itself and its companion piece may be taken out together with the other parts before described.

Having thus fully described my invention, I claim and desire to secure by Letters Patent of the United States:—

1. In a valve of the character specified, the combination with a valve casing forming the main body of the valve, of a removable member contained within said casing having through it a narrow elongated port, the inner face of which member forms a valve seat and which member also is provided with an extension providing a seat for the valve when open, a valve adapted to bear against and slide over said member and extension thereof for controlling said port, and means whereby said valve may be operated to control said port with any degree of graduated opening.

2. In a valve the combination with a valve casing forming the main body of the valve of a removable member contained within said casing and having a port extending through the same, the inner face of which member forms a valve seat and which member also, is provided with an extension for elongating the valve seat and supporting the valve when open, a valve adapted to bear against and slide over the inner face of said member and extension for controlling said port, means for holding the valve against said seat during the operation thereof and means whereby said valve may be operated to slide over said member and control said port.

3. In a valve of the character specified, the combination with a main valve casing having inlet and outlet passages, of a detachable bonnet mounted thereon, a detachable plug located in the outlet passage of said main valve casing and forming a valve seat with an elongated port formed therein and which plug also is provided with an extension for elongating said valve seat, a valve resting against said valve seat to slide thereon for controlling said port, means for holding said valve in operative position to bear against and slide upon its valve seat, a valve stem with which said valve makes connection, an elongated nut extending through and threaded in said bonnet and through which nut said stem is adapted to extend to turn therein, and a collar located upon said stem and adapted to engage with the end of said elongated nut acting as an adjustable stop for determining the degree of opening of said valve upon outwardly turning said stem in said nut.

SAMUEL H. WOODBRIDGE.

In presence of—
 ARTHUR E. FREEMAN,
 G. E. LIBBEY.